(12) United States Patent
Mikalsen (10) Patent No.: US 12,351,283 B2
(45) Date of Patent: Jul. 8, 2025

(54) MARINE VESSEL WITH FLYWHEELS FOR PROVIDING ELECTRICAL POWER AND STABILIZING ANGULAR ROTATION OF THE MARINE VESSEL

(71) Applicant: Marine Technologies, LLC, Cut Off, LA (US)

(72) Inventor: Jan Mikalsen, Covington, LA (US)

(73) Assignee: Spinning Reserve, LLC, Cut Off, LA (US)

( * ) Notice: Subject to any disclaimer, the term of this patent is extended or adjusted under 35 U.S.C. 154(b) by 598 days.

(21) Appl. No.: 17/841,581

(22) Filed: Jun. 15, 2022

(65) Prior Publication Data
US 2022/0396338 A1 Dec. 15, 2022

Related U.S. Application Data (60) Provisional application No. 63/210,917, filed on Jun. 15, 2021.

(51) Int. Cl.
 *B63B 39/14* (2006.01)
 *B63B 35/44* (2006.01)
 (Continued)

(52) U.S. Cl.
 CPC ............. *B63B 39/14* (2013.01); *B63B 79/40* (2020.01); *B63H 11/00* (2013.01); *B63B 35/44* (2013.01); *B63B 2035/446* (2013.01)

(58) Field of Classification Search
 CPC ......... B63B 39/14; B63B 79/40; B63B 35/44; B63B 2035/446; B63B 35/00; B63B 39/04; B63H 11/00; G01C 21/203
 See application file for complete search history.

(56) References Cited

U.S. PATENT DOCUMENTS

| 769,493 A | 9/1904 | Schlick |
| 1,150,311 A | 8/1915 | Sperry |
| | (Continued) | |

FOREIGN PATENT DOCUMENTS

| CN | 201891989 U | 7/2011 |
| CN | 102616149 A | 8/2012 |
| | (Continued) | |

OTHER PUBLICATIONS

International Search Report and Written Opinion on PCT/US2022/033674 Dtd Sep. 23, 2022, 17 pgs.

*Primary Examiner* — Anthony D Wiest
(74) *Attorney, Agent, or Firm* — Foley & Lardner LLP (57) ABSTRACT

A marine vessel may include thrusters, an electrical system, and multiple flywheels (i) to supply electrical power to the electrical system and (ii) to stabilize marine vessel roll and/or pitch angle. A flywheel controller may be configured to control electrical power output from the flywheels to the electrical system, and control axis of rotation of one or more rotors of respective flywheels to compensate for roll and/or pitch angles of the marine vessel. A method of powering and stabilizing a marine vessel may include supplying, by flywheels, electrical power to an electrical system to supply electrical power to thrusters and electrical equipment. Flywheel(s) may be used to stabilize marine vessel roll and/or pitch angle. Electrical power output may be controlled from the flywheels to the electrical system. Axis of rotation of one or more flywheel rotors may be controlled to compensate for roll and/or pitch angles of the marine vessel.

20 Claims, 5 Drawing Sheets

(51) Int. Cl.
*B63B 79/40* (2020.01)
*B63H 11/00* (2006.01)

(56) References Cited

U.S. PATENT DOCUMENTS

| | | |
|---|---|---|
| 1,236,204 A | 8/1917 | Norden |
| 1,558,720 A | 10/1925 | Thompson |
| 1,640,549 A | 8/1927 | Lamme |
| 4,159,427 A | 6/1979 | Wiedemann |
| 4,723,735 A * | 2/1988 | Eisenhaure ............ B64G 1/283 310/90.5 |
| 4,940,433 A | 7/1990 | Raber |
| 5,628,267 A | 5/1997 | Hoshio et al. |
| 6,645,017 B1 | 11/2003 | Skrzypek et al. |
| 6,973,847 B2 | 12/2005 | Adams et al. |
| 7,004,800 B2 | 2/2006 | Mori et al. |
| 7,270,582 B2 | 9/2007 | Mori et al. |
| 7,377,853 B2 | 5/2008 | Takeuchi et al. |
| 8,973,359 B2 | 3/2015 | Chan |
| 9,667,098 B2 | 5/2017 | Soueidan |
| 10,974,802 B2 | 4/2021 | Gjerpe et al. |
| 2005/0274210 A1 | 12/2005 | Adams et al. |
| 2007/0162217 A1* | 7/2007 | Selbe ...................... B63B 39/04 701/116 |
| 2016/0036365 A1 | 2/2016 | Bryant |
| 2020/0052549 A1 | 2/2020 | Sohn |
| 2021/0190045 A1 | 6/2021 | Zhang et al. |
| 2021/0197674 A1 | 7/2021 | Boroy et al. |

FOREIGN PATENT DOCUMENTS

| | | |
|---|---|---|
| CN | 105923118 A | 9/2016 |
| CN | 106329885 A | 1/2017 |
| CN | 106853767 A | 6/2017 |
| CN | 206272328 U | 6/2017 |
| CN | 106100029 B | 1/2019 |
| CN | 106853767 B | 2/2019 |
| CN | 208484554 U | 2/2019 |
| CN | 107826132 B | 3/2019 |
| CN | 106877457 B | 6/2019 |
| CN | 110304228 A | 10/2019 |
| CN | 110994880 B | 10/2020 |
| CN | 109995065 B | 12/2020 |
| CN | 215498527 U | 1/2022 |
| CN | 216904555 U | 7/2022 |
| DE | 10 2008 047 244 A1 | 3/2010 |
| EP | 1 639 314 A1 | 3/2006 |
| EP | 1 889 782 B1 | 8/2009 |
| EP | 3 433 486 A1 | 1/2019 |
| EP | 3 464 877 A1 | 4/2019 |
| EP | 3 405 388 B1 | 3/2020 |
| KR | 20100082565 A | 7/2010 |
| RU | 195793 U1 | 2/2020 |
| WO | WO-2016/078662 A1 | 5/2016 |
| WO | WO-2016/131460 A1 | 8/2016 |
| WO | WO-2017/097305 A1 | 6/2017 |
| WO | WO-2018/192632 A1 | 10/2018 |
| WO | WO-2019/076419 A1 | 4/2019 |
| WO | WO-2020/083452 | 4/2020 |

* cited by examiner

MARINE VESSEL WITH FLYWHEELS FOR PROVIDING ELECTRICAL POWER AND STABILIZING ANGULAR ROTATION OF THE MARINE VESSEL

RELATED APPLICATIONS

This application claims priority to U.S. Provisional Application having Ser. No. 63/210,917 filed on Jun. 15, 2021; the contents of which are incorporated herein by reference in their entirety.

BACKGROUND OF THE INVENTION

Figure 1:
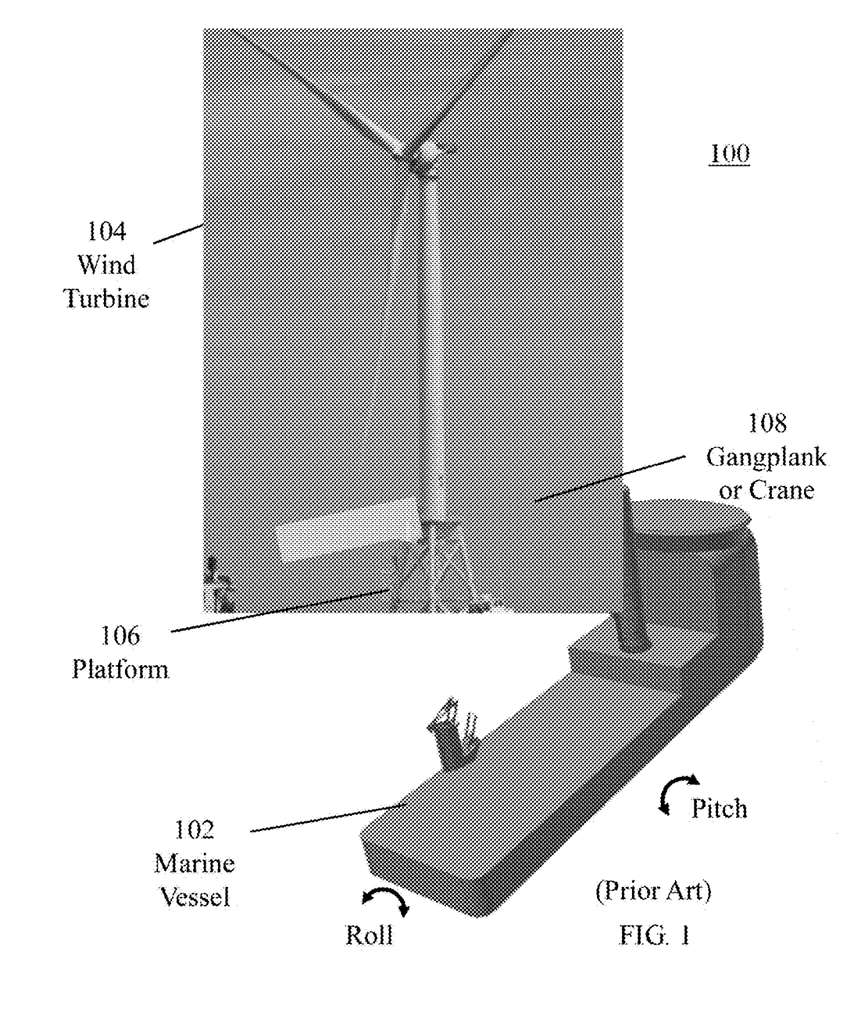
FIG. 1 is an offshore environment in which marine vessel is positioned at a wind turbine positioned on a platform.

Marine vessels are used for a variety of reasons. One use of a marine vessel is to service wind turbines and other offshore structures, such as drilling rigs. As shown in FIG. 1, an offshore environment in which marine vessel 102 is positioned at a wind turbine 104 positioned on a platform 106. For operators to access the platform, a gangplank or crane 108 may be extended from the marine vessel 102. The gangplank 108 may have a length of up to 30 meters or more. In general, marine vessels that are positioned at offshore structures free-float to avoid a collision with the offshore structures. However, while the marine vessel 102 is protected from colliding with the platform 106, the gangplank 108 may move up-and-down and side-to-side as a result of wave motion causing the marine vessel 102 to roll about a roll axis and pitch about a pitch axis. Such movement of the gangplank 108 may also be dangerous to operators who are crossing the gangplank 108. For example, if a gangplank is extended 30 meters, a small angular roll may cause the end of the gangplank to move several feet. Although some gangplanks have stabilizers, roll and pitch motions of marine vessels often overcome the stabilization capabilities of the gangplank stabilizer. As such, there is a need to minimize motion of the marine vessel 102 to minimize motion of the gangplank 108.

Although the above scenario is problematic, it should be understood that there are many other problematic operational scenarios when pitch and roll motions of marine vessels occur, especially while in transit. Roll of a marine vessel is typically the most difficult for humans. Roll motions are often more challenging to handle for people because roll motions are much different from motions experienced on land. Roll motions can be disorienting to people, and also cause the most damage to items on a marine vessel due to torque resulting from waves that contact and pass the marine vessels. Vessels are less stable about the roll axis, so waves that cause marine vessels to roll tend to be magnified and produce angular momentum, which can cause responsive rolling or oscillation of the marine vessels (i.e., roll to port and rebound to starboard). Pitch motions, by contrast, are more natural for humans and have less impact on the marine vessels because length of marine vessels typically offset shorter waves. While roll motion is problematic, it takes less energy to dampen the roll motion. To reduce or eliminate damage to marine vessel structures (e.g., gangplank 108) or items on the marine vessel (e.g., tables, chairs, other non-fixtures) and improve operations for operators and/or passengers of a marine vessel by reducing both roll and pitch motions, a stabilization system and process for stabilizing the marine vessel is needed.

Historically, energy usage for marine vessels have been driven by diesel engines or power plants. Diesel engines are relatively inefficient, consume significant amounts of fuel, and produce undesirable emissions. To improve fuel emissions, alternative power sources are desirable for marine vessels. However, such alternative power sources for large marine vessels must (i) be capable of generating large amounts of power to power propulsion systems and many other electrically powered devices, such as navigation systems, radar systems, lights, and many other electrically powered devices and (ii) be capable of sustained power for long voyages.

SUMMARY OF THE INVENTION

To overcome the problems of marine vessel stabilization systems and provide alternative energy systems that are capable of producing high levels of electrical energy over long periods of time, evolved energy sources, such as flywheels, are capable of being charged by an off-board and/or onboard energy source to thereafter produce large amounts of electrical power to power the marine vessel over long periods of time. The flywheels may further be configured to provide for either or both roll and pitch stabilization by electromechanically controlling orientation of a stator of the flywheel(s). Control of the flywheel(s) may be performed by utilizing measurements from an inertial measurement unit (IMU) and applying control signals to the flywheel(s) to control orientation of the flywheel(s). In an embodiment, multiple flywheels may be utilized, and the system for controlling orientation of the flywheels may control one or multiple of the flywheels for vessel stabilization, when needed, to provide either or both roll and pitch stabilization.

One embodiment of a marine vessel may include thrusters, an electrical system, and multiple flywheels (i) to supply electrical power to the electrical system and (ii) to stabilize marine vessel roll and/or pitch angle. A flywheel controller may be configured to control electrical power output from the flywheels to the electrical system, and control axis of rotation of one or more rotors of respective flywheels to compensate for roll and/or pitch angles of the marine vessel.

One embodiment of a method of powering and stabilizing a marine vessel may include supplying, by flywheels, electrical power to an electrical system to supply electrical power to thrusters and electrical equipment. Flywheel(s) may be used to stabilize marine vessel roll and/or pitch angles. Electrical power output may be controlled from the flywheels to the electrical system. Axis of rotation of one or more flywheel rotors may be controlled to compensate for roll and/or pitch angles of the marine vessel, thereby stabilizing the marine vessel in the roll and/or pitch angles.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Energy usage by marine vessels is quite large given propulsion needs of the marine vessels along with the amount of power consumption typically found on marine vessels. Evolved energy sources, such as flywheels, are capable of being charged by an off-board and/or onboard energy source. For example, when docked, a charging station that receives power from a terrestrial power grid may be utilized to charge the flywheels. When stationed offshore, energy sources at wind turbines, oil rigs, or other offshore platforms may be utilized to charge the flywheels. Electrical power may be drawn via a conductor, wired or wireless, and be applied to the flywheels to create rotational potential energy that can be used to generate electricity and/or provide angular stabilization of the marine vessel.

In addition to the flywheels being used as power sources, as a result of the flywheels providing a gyro effect to resist a change in their respective axes of rotation, the flywheels may be utilized to actively provide roll and/or pitch stabilization. In an embodiment, electromagnetics that exist in the flywheels may be used to control orientation of stator(s) of the flywheel(s) to offset roll and pitch motion resulting from wind and wave effects on the marine vessel. In the case of using multiple flywheels, such as 20 or more, a portion of the flywheels may be partially or fully dedicated to supplying power and the remainder may be partially or fully dedicated to performing vessel stabilization. Because the flywheels may be individually controlled, a controller may be capable of dynamically controlling how many and which flywheels to be used for vessel stabilization purposes.

Flywheels are capable of operating at 9,000 RPM or higher as a result of operating within a vacuum. The flywheels are silent, balanced, and generate no emissions, so a marine vessel that utilizes flywheels as power sources are capable of operating with low or no emissions and without the typical vibrations and noise produced by large diesel engines.

Figure 2:
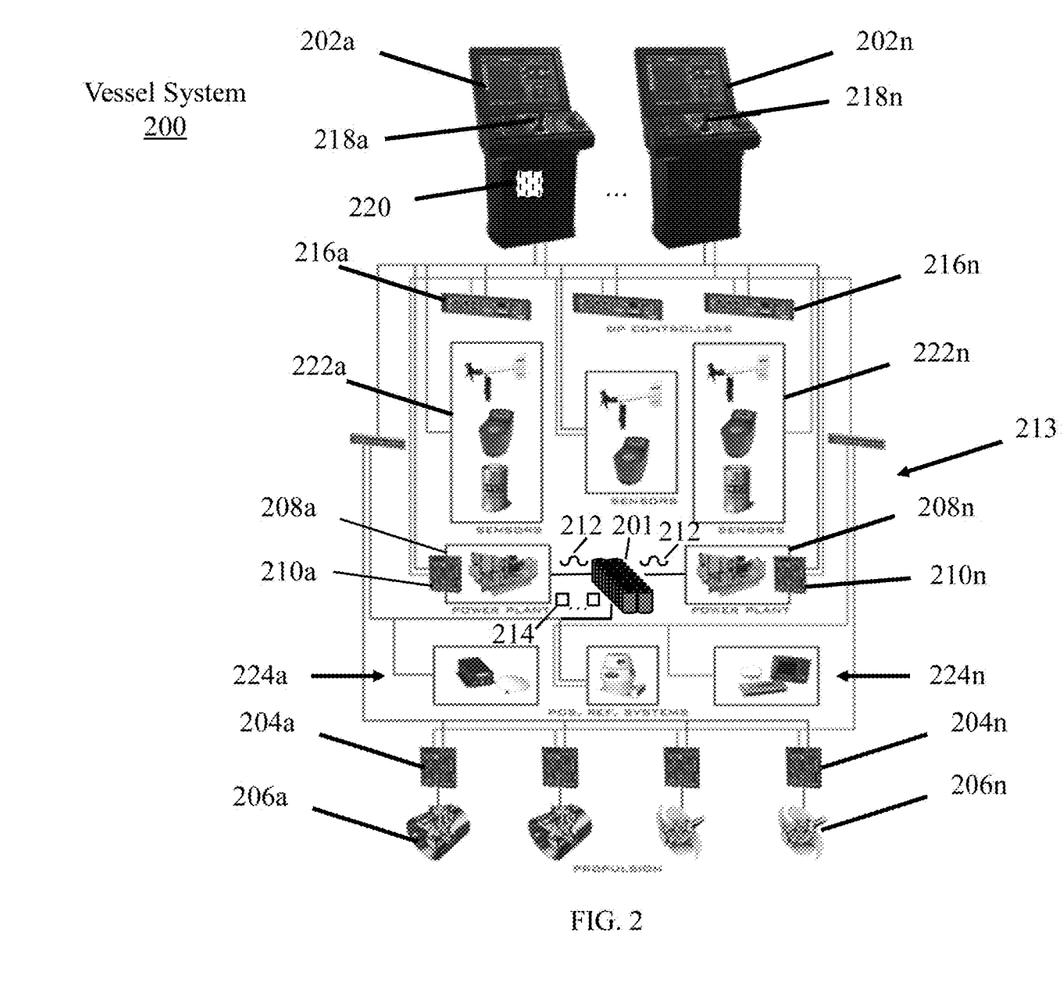
FIG. 2 is an illustrative vessel system inclusive of flywheels used to supply electrical power to an electrical system and to stabilize roll and/or pitch of the marine vessel.

With regard to FIG. 2, an illustrative vessel system 200 inclusive of flywheels 201 used to supply electrical power to an electrical system and to stabilize roll and/or pitch of the marine vessel is shown. In managing a vessel in which the vessel system 200 is employed, an operator may interface with the vessel system 200 via user interfaces 202a-202n (collectively 202) that are typically located on a bridge or control center of a vessel. The vessel system 200 is shown to include a variety of subsystems and components, including propulsion that include propulsion controllers or drivers 204a-204n (collectively 204) and thrusters 206a-206n (collectively 206). The thrusters 206 may include (i) conventional propellers that may be driven by power plants or electrical generators (e.g., diesel engines, flywheels, etc.) 208a-208n (collectively 208) and (ii) electrically-controlled thrusters (e.g., tunnel thrusters) that are driven by electrical equipment 210a-210n (collectively 210) that may convert energy from rotating main shafts extending from the power plants 208 that are driving the thrusters 206 or the rotating flywheels 201. Power signals 212 produced by the power plants 208 may be applied to the flywheels 201 for recharging purposes. In addition, the electrical equipment 210, which may be part of the electrical generators 208, may be electrically powered by the flywheels 201 in electrical communication with the flywheels 201.

In one embodiment, a marine vessel may be configured without conventional power plants 208, but rather include recharging equipment (e.g., power conditioner, electrical conductors, switches, controller to control the switches, etc.) that are configured to provide for recharging the flywheels 201. By not including the power plants 208, a significant amount of money and weight may be saved and the marine vessel may utilize flywheels 201 to power the marine vessel and vessel system 200. It should be understood that variations of a marine vessel having power plant(s) to recharge the flywheels 201 may be provided. For example, a marine the power plant(s) may be capable of recharging the flywheels 201 over time, but not capable of providing sufficient power for driving the thrusters 206 for an extended period of time may be utilized. Such a configuration is meant to be used more for backup or emergency situations in which the marine vessel is unable to recharge at a recharging station capable of being able to recharge at a faster rate.

In an embodiment, the flywheels 201 may be configured to be capable of driving electrical power signals 212 via an electrical system 213 to the thrusters 206, which may be electrically driven. Control signals 214 may be generated by a flywheel controller 220 and include angle commands to cause an electromagnet in one or more of the flywheels 201 to control axis of rotation of one or more rotors of respective flywheels to be altered, thereby offsetting roll and/or pitch angle of the marine vessel. The axis of rotation of the rotor includes tilt angle (e.g., degrees from vertical) and heading angle (i.e., angle about a 360 horizontal circle at which the tilt of the rotor is performed). The flywheels 201 may have unique network addresses so that the flywheel controller 220 may be capable of communicating with specific ones of the flywheels 201. In an embodiment, a controller may broadcast control signal(s) 214 to an addressable group or subset of flywheels 201. In particular, the control signal(s) 214 may cause an active magnetic bearing (AMB) of a flywheel to cause a rotor axis of rotation to rotate at a certain tilt angle and along a certain heading angle. Control signals 214 may cause each of the flywheels being used as vessel stabilizers to be oriented with the same tilt angle and heading angle. Alternatively, the control signals may cause different ones of the flywheels to have the axes of rotation of the respective rotors be oriented in different tilt angles and/or at different heading angles, which may be based on relative position of the flywheels within the marine vessel or control processes for marine vessel roll/pitch compensation.

With further regard to FIG. 2, the vessel system 200 may further include dynamic positioning controllers 216a-216n (collectively 216) that may be configured to semi-automatically or automatically operate the power plants 208. The dynamic positioning controllers 216 may also be configured to control operation of the flywheels 201 and control electrical power produced by the flywheels 201 to be conducted onto the electrical system 213. To control the electrical power flow, an output switch of the flywheels 201 or switches in the electrical system 213 along electrical conductors may be switched from an OFF state to an ON state, and then switched back to an OFF state if a condition (e.g., heavy wind or waves, roll angle crossing a minimum angle, use of a gangplank or crane, etc.) that cause the stabilization system and processes to be automatically turned ON. In an embodiment, the stabilization control may always be ON when the marine vessel is in operation.

The dynamic positioning controllers 216 may be used to control direction of the vessel by applying a certain amount of power to control thrust by altering operation of each of the power plants 208, if being utilized, and/or propulsion 206.

The dynamic positioning controllers 216 may also be configured to control angle of one or more rudder(s) (not shown) of the vessel to further help maneuver the vessel, as desired by the operator interfacing with the user interfaces 202. For example, the operator may adjust position of a joystick 218a-218n (collectively 218) (e.g., forward-left, forward-right, back-left, back-right) to cause any of speed and direction of the power plants 208, propulsion 206, and/or rudder(s) to be adjusted to cause the vessel to follow a command by the operator. Alternatively, the user interface 200 may be programmed to automatically drive the vessel to a particular coordinate, such as a global positioning system (GPS) coordinate.

The flywheel controller 220 may be positioned at the user interfaces 202 or be in communication therewith. It should be understood that there may be one or more flywheel controllers 220. The flywheel controller 220 may be configured to manage a recharging process and operation of the flywheels 201. In an embodiment, the user interfaces 202 may enable a user to submit parameters to configure the flywheel controller 220 to operate in a manner that maximizes electrical power supply versus vessel stabilization provided by the flywheels 201.

The vessel system 200 may further include sensors 222a-222n (collectively 222). The sensors 222 may be environmental sensors configured to sense environmental parameters (e.g., wind, current, temperature, atmospheric pressure, and so on) and operational sensors (e.g., voltmeter, current meter, speedometer, thermometer, etc.) to sense operational parameters (e.g., electrical power generator voltage and current, present or instant charge of the flywheels 201, equipment and/or fluid temperature, fluid pressure, rotational velocity, and so on). The sensed environmental and operational parameters may be used by the flywheel controller 220 to estimate and/or project power consumption by the marine vessel to manage current and projected electrical power draw on the flywheels 201 so as to avoid charge of the flywheels 201 from dropping below a minimum threshold level (e.g., 10% threshold level). It should be understood that one or more threshold levels may be used by the flywheel controller 220 to provide for management of the flywheels 201 under different operational conditions and power consumption strategies. Positional reference system components 224a-224n (collectively 224) may also be utilized to assist with navigation.

Figure 3:
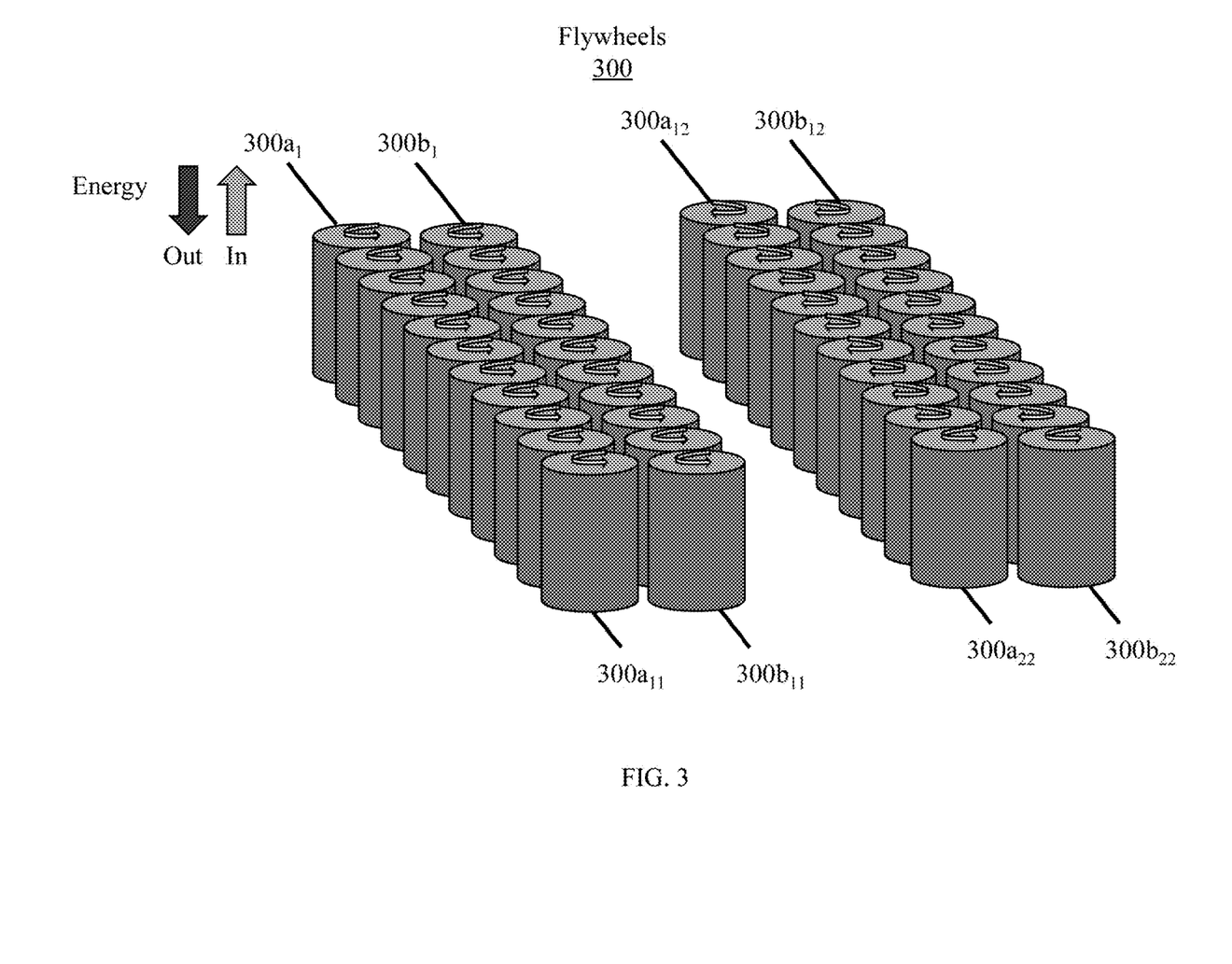
FIG. 3 is an illustration of an illustrative set of flywheels that may be configured in flywheel pairs.

As shown in FIG. 3, an illustration of a set of flywheels 300 that may include 22 flywheel pairs (i.e., 44 flywheels) $300a_1$-$300a_{22}$ is shown. The flywheels 300 may be capable of generating 4 MW hours (MWH), which supports upwards of 4 hours of operation before recharging depending on operational needs. In an embodiment, each of the flywheels 300 may be capable of storing sufficient energy to produce 100 KW hours or more, and each may lose only 2% capacity over a 24 hour period. It should be understood that more or fewer numbers of flywheels may be utilized, and that different size flywheels may be utilized aboard a single vessel, possibly for different energy and/or vessel stabilization purposes. By using the flywheels 300 for both energy storage and energy sourcing, the ability to use the flywheels to provide for vessel stabilization is available essentially at no additional cost. It should be understood that the number of flywheels 300 may vary depending upon a desired (i) amount of electrical power for powering the marine vessel and (ii) amount of roll and/or pitch stabilization. In an embodiment, the flywheels 300 may come in pairs (e.g., $300a1/300b1$, $300a22/300b22$).

Figure 4:
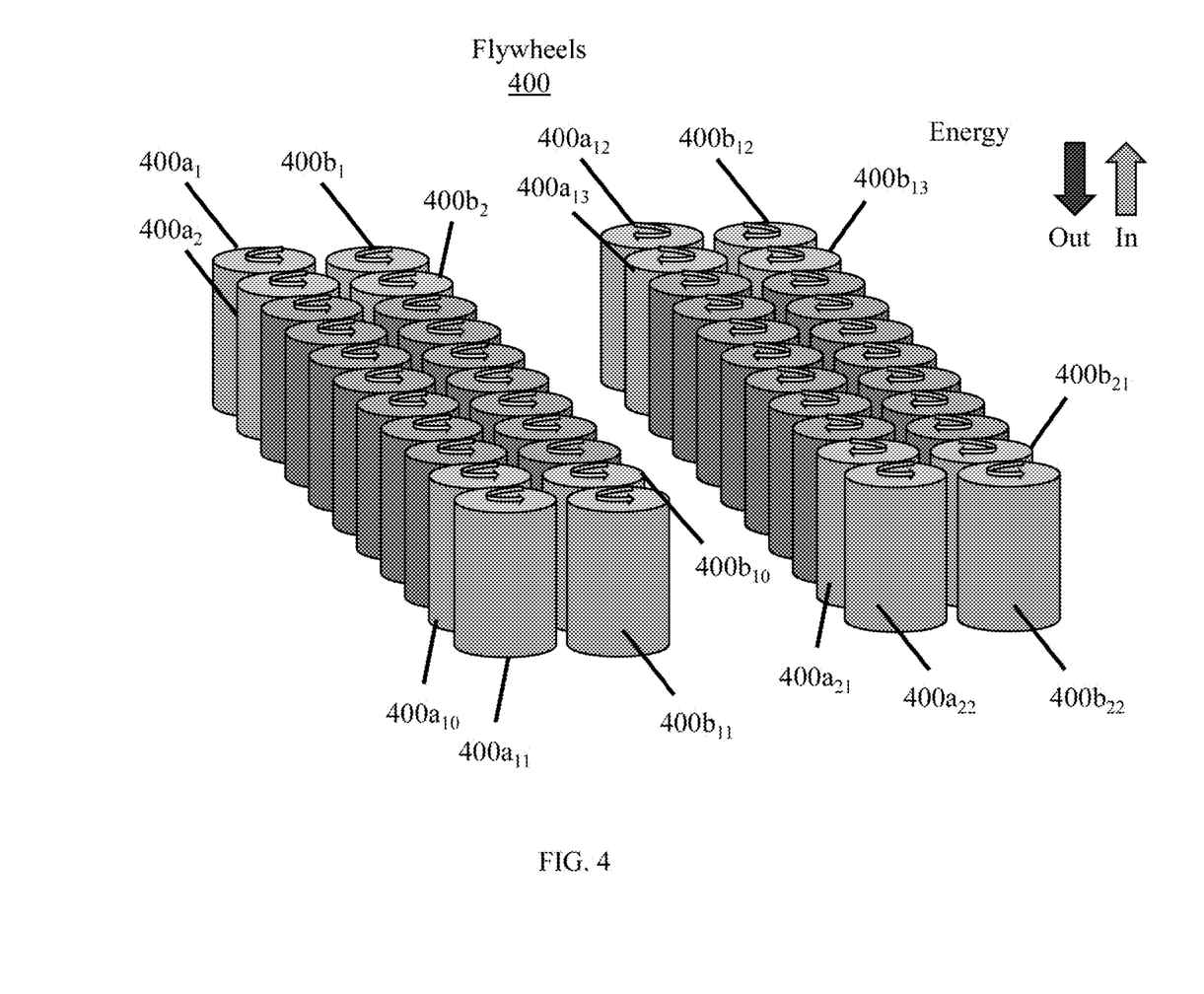
FIG. 4, an illustration of an illustrative set of flywheels, where a subset of which may be used as a power source, and another subset of which may be used for vessel stability control.

With regard to FIG. 4, an illustration of a set of flywheels 400 may include flywheels $400a_1$-$400a_{22}$ (collectively 400), where a subset of which may be used as a power source, and another subset of which may be used for stability control is shown. As shown, subset ($400a_1$, $400a_2$, $400a_{10}$, $400a_{11}$, $400b_1$, $400b_2$, $400b_{10}$, $400b_{11}$, $400a_{12}$, $400a_{13}$, $400a_{21}$, $400a_{22}$, $400b_{12}$, $400b_{13}$, $400b_{21}$, $400b_{22}$) may be used for stability control and the remainder ($400a_3$-$400a_9$, $400b_3$-$400b_9$, $400a_{14}$-$400a_{20}$, $400b_{14}$-$400b_{20}$) may be used as power sources. As previously described, the specific numbers of the flywheels 400 may be dynamically selected to be used for vessel stabilization and power sourcing. For example, and as shown, the number of flywheels 400 being used for vessel stabilization may be 16 and the number of flywheels 400 being used as power sources may be 28.

If wave sizes increase and an onboard IMU measures that the marine vessel roll and/or pitch angle(s) reach a certain angle, such as greater than 1-degree, then a flywheel controller (see FIG. 2, controller 220 may automatically employ a subset of the flywheels 400 to offset roll and/or pitch angle(s). It should be understood that the certain angle may be different for roll and pitch angles. The flywheel controller may include control software that executes on a processor or other controller hardware. In addition to or as an alternative to using the IMU to measure marine vessel roll and/or pitch angle(s), the flywheels 400 themselves may be utilized to sense roll and/or pitch angle(s) of the marine vessel and communicate the angle measurements to the flywheel controller. In another embodiment, a subset (e.g., 40%-55%) of the flywheels 400 may be exclusively used as vessel stabilizers and another subset (e.g., 45%-60%) of the flywheels 400 may be exclusively used as power sources. In yet another embodiment, a subset of the flywheels 400 that are permanently or dynamically utilized to perform vessel stabilization may be utilized to perform roll stabilization (e.g., 10%-15%) and another subset (e.g., 30%-40%) may be utilized to perform pitch stabilization. It should be understood, however, that active magnet control may enable control of the orientation of roll/pitch of the flywheels 400 in 360 degrees with a maximum tilt magnitude of 0.7 degrees of rotational angle of the rotor, in an embodiment.

Figure 5:
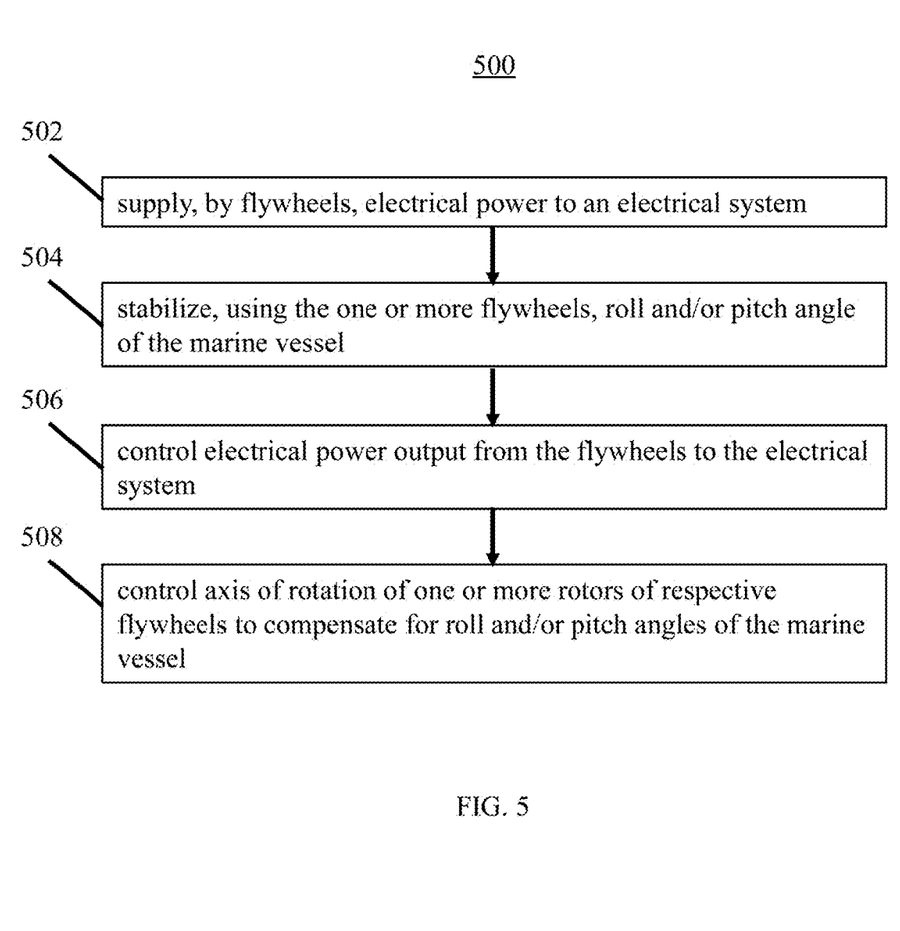
FIG. 5 is a flow diagram of an illustrative process for powering and stabilizing a marine vessel using flywheels.

With regard to FIG. 5, a flow diagram of an illustrative process 500 for powering and stabilizing a marine vessel using flywheels is shown. The process 500 may start at step 502 where electrical power is supplied by flywheels to an electrical system to supply electrical power to thrusters and electrical equipment connected to the electrical system. At step 504, one or more flywheels may be used to stabilize roll and/or pitch angle of the marine vessel. In using the flywheels to stabilize roll and/or pitch angle, axis of rotation of a rotor of the flywheel may be controlled (e.g., using magnets in the flywheel). At step 506, electrical power output from the flywheels to the electrical system may be controlled. At step 508, axis of rotation of one or more rotors of respective flywheels may be controlled to compensate for roll and/or pitch angles of the marine vessel.

The process may further include communicating a control signal to alter a magnetic field within one or more of the flywheels to cause the axis of rotation of the respective of one or more rotors to be altered. Roll and pitch angles of the marine vessel may be sensed, and, in response to sensing roll and pitch angles, control signals may be communicated to one or more of the flywheels to stabilize roll and/or pitch angles of the marine vessel by altering axis of rotation of the one or more rotors of the respective one or more flywheels.

The process may further be configured to cause a first subset of the flywheels to supply power to the electrical system of the marine vessel, and control a second subset of the flywheels to compensate for roll and/or pitch angles of the marine vessel. In an embodiment, roll and pitch angles of the marine vessel may be determined, and axis of rotation of the one or more rotors of respective one or more flywheels that are currently supplying power to the electrical system may be dynamically altered.

A determination that a gangplank or crane is in an operational state may be made, and in response to determining that the gangplank or crane is in an operational state, control of the axis of rotation of the one or more rotors of the respective one or more flywheels to stabilize the marine vessel in roll and/or pitch directions may be automatically initiated.

Moreover, a determination may be made when roll and pitch angles of the marine vessel cross a respective minimum threshold value, and control of the axis of rotation of the one or more rotors of the respective one or more flywheels to stabilize the marine vessel in roll and/or pitch directions may be automatically initiated.

Communication of control signals may be sent via a communications network to each of the flywheels via a respective unique network address to control axis of rotation of the rotors of the one or more flywheels to compensate for roll and/or pitch angles of the marine vessel. The control signals may be communicated to cause different flywheels to have the same axis of rotation of the respective rotors. In an embodiment, remaining electrical power available to be produced by the flywheels may be monitored, and a controller may be configured to control whether the respective flywheels are to supply electrical power to the electrical system or to be utilized for stabilizing the marine vessel based on the remaining electrical power. Monitoring the remaining electrical power may be performed based on speed of the flywheel, current electrical power being output, timing of a clock, or otherwise.

In an embodiment, a diesel engine may function as a backup to generating electrical power for the flywheels or be utilized to provide additional electrical power in the event that all or a large subset of the flywheels are being utilized for stabilization. The flywheels may produce electrical power when being utilized for stabilization, but the electrical power from the flywheels may be reduced, so additional electrical power may be desired to ensure sufficient electrical power is available.

The previous description is of at least one embodiment for implementing the invention, and the scope of the invention should not necessarily be limited by this description. The scope of the present invention is instead defined by the following claims.

What is claimed is:

1. A marine vessel, comprising:
   thrusters configured to propel the marine vessel;
   an electrical system configured to conduct electrical power to electrical devices and thrusters;
   a plurality of flywheels configured (i) to supply electrical power to the electrical system and (ii) to stabilize roll and/or pitch angle of the marine vessel; and
   a flywheel controller configured to:
   control electrical power output from the flywheels to the electrical system; and
   select a subset of the flywheels to control to stabilize roll and/or pitch angle of the marine vessel;
   control axis of rotation of respective one or more rotors of the selected subset of flywheels to compensate for roll and/or pitch angles of the marine vessel.

2. The marine vessel according to claim 1, wherein the flywheel controller is further configured to communicate a control signal to alter a magnetic field within one or more of the selected subset of flywheels to cause the axis of rotation of the respective of one or more rotors to be altered.

3. The marine vessel according to claim 1, further comprising an inertial measurement unit (IMU) in electrical communication with the flywheel controller, and configured to:
   sense roll and pitch angles of the marine vessel; and
   communicate control signals to the flywheel controller to cause one or more of the selected set of flywheels to stabilize roll and/or pitch angles of the marine vessel by altering axis of rotation of the one or more rotors of the respective one or more of the selected subset of flywheels.

4. The marine vessel according to claim 1, wherein the flywheel controller is configured to:
   cause a first subset of the flywheels to supply power to the electrical system of the marine vessel; and
   control a second, selected subset of the flywheels to compensate for roll and/or pitch angles of the marine vessel.

5. The marine vessel according to claim 1, wherein the flywheel controller is further configured to:
   determine roll and pitch angles of the marine vessel; and
   dynamically cause axis of rotation of the one or more rotors of respective one or more of the selected subset of flywheels that are currently supplying power to the electrical system to be altered.

6. The marine vessel according to claim 1, wherein the flywheel controller is further configured to:
   determine that a gangplank or crane is in an operational state; and
   automatically initiate controlling one or more of the selected subset of flywheels to stabilize the marine vessel in roll and/or pitch directions.

7. The marine vessel according to claim 1, wherein the flywheel controller is further configured to:
   determine when roll and pitch angles of the marine vessel cross a respective minimum threshold value; and
   automatically initiate controlling one or more of the selected subset of flywheels to stabilize the marine vessel in roll and/or pitch directions.

8. The marine vessel according to claim 1, wherein each of the flywheels are assigned a unique network address on a communications network on the marine vessel, and wherein the flywheel controller is further configured to communicate with each of the flywheels via the unique network address to control axis of rotation of the rotors of the one or more selected subset of the flywheels to compensate for roll and/or pitch angles of the marine vessel.

9. The marine vessel according to claim 8, wherein the flywheel controller is further configured to communicate the control signals to cause different flywheels to have the same axis of rotation of the respective rotors.

10. The marine vessel according to claim 1, wherein the flywheel controller is further configured to monitor remaining electrical power available to be produced by the flywheels and control whether the respective flywheels are to supply electrical power to the electrical system or to be utilized for stabilizing the marine vessel based on the remaining electrical power.

11. A method of powering and stabilizing a marine vessel, comprising:

supplying, by flywheels, electrical power to an electrical system to supply electrical power to thrusters and electrical equipment connected to the electrical system;
stabilizing, using one or more flywheels, roll and/or pitch angle of the marine vessel;
controlling electrical power output from the flywheels to the electrical system;
selecting a subset of the flywheels to control to stabilize roll and/or pitch angle of the marine vessel; and
controlling axis of rotation of respective one or more rotors of the selected subset of the flywheels to compensate for roll and/or pitch angles of the marine vessel.

12. The method according to claim 11, further comprising communicating a control signal to alter a magnetic field within one or more of the selected subset of flywheels to cause the axis of rotation of the respective of one or more rotors to be altered.

13. The method according to claim 11, further comprising:
sensing roll and pitch angles of the marine vessel; and
in response to sensing roll and pitch angles, communicating control signals to one or more of the selected subset of flywheels to stabilize roll and/or pitch angles of the marine vessel by altering axis of rotation of the one or more rotors of the respective one or more flywheels.

14. The method according to claim 11, further comprising:
causing a first subset of the flywheels to supply power to the electrical system of the marine vessel; and
controlling a second, selected subset of the flywheels to compensate for roll and/or pitch angles of the marine vessel.

15. The method according to claim 11, further comprising:
determining roll and pitch angles of the marine vessel; and
dynamically causing axis of rotation of the one or more rotors of respective one or more of the selected subset of flywheels that are currently supplying power to the electrical system to be altered.

16. The method according to claim 11, further comprising:
determining that a gangplank or crane is in an operational state; and
automatically initiating control of the axis of rotation of the one or more rotors of the respective one or more of the selected flywheels to stabilize the marine vessel in roll and/or pitch directions.

17. The method according to claim 11, further comprising:
determining when roll and pitch angles of the marine vessel cross a respective minimum threshold value; and
automatically initiating control of the axis of rotation of the one or more rotors of the respective one or more of the selected subset of flywheels to stabilize the marine vessel in roll and/or pitch directions.

18. The method according to claim 11, further comprising communicating control signals with each of the flywheels via a respective unique network address to control axis of rotation of the rotors of the one or more of the selected subset of flywheels to compensate for roll and/or pitch angles of the marine vessel.

19. The method according to claim 18, further comprising communicating the control signals to cause different flywheels to have the same axis of rotation of the respective rotors.

20. The method according to claim 11, further comprising:
monitoring remaining electrical power available to be produced by the flywheels; and
controlling whether the respective flywheels are to supply electrical power to the electrical system or to be utilized for stabilizing the marine vessel based on the remaining electrical power.

* * * * *